United States Patent
Sautter et al.

(10) Patent No.: US 7,444,881 B2
(45) Date of Patent: Nov. 4, 2008

(54) FORCE MEASURING DEVICE

(75) Inventors: Sven Sautter, Reutlingen (DE);
Andreas Hampe, Kirchheim (DE)

(73) Assignee: BAG Bizerba Automotive GmbH, Balingen (DE)

( * ) Notice: Subject to any disclaimer, the term of this patent is extended or adjusted under 35 U.S.C. 154(b) by 0 days.

(21) Appl. No.: 11/858,154

(22) Filed: Sep. 20, 2007

(65) Prior Publication Data
US 2008/0078254 A1    Apr. 3, 2008

Related U.S. Application Data (63) Continuation of application No. PCT/EP2006/002881, filed on Mar. 30, 2006.

(30) Foreign Application Priority Data
Apr. 5, 2005 (DE) .................. 10 2005 016 432

(51) Int. Cl.
*G01B 7/16* (2006.01)
*G01L 1/00* (2006.01)
(52) U.S. Cl. .................................................... 73/779
(58) Field of Classification Search ............ 73/862.69, 73/779
See application file for complete search history.

(56) References Cited

U.S. PATENT DOCUMENTS

| | | | | |
|---|---|---|---|---|
| 2,600,701 A * | 6/1952 | Statham et al. | ............... | 338/5 |
| 2,968,943 A * | 1/1961 | Statham | ............... | 73/862.59 |
| 3,118,108 A | 1/1964 | Zoss et al. | | |
| 3,142,796 A * | 7/1964 | Goldberg et al. | ............ | 324/71.1 |
| 3,402,307 A * | 9/1968 | Judea | ............ | 310/10 |
| 4,254,395 A * | 3/1981 | Herden | ............ | 338/42 |
| 4,352,085 A * | 9/1982 | Herden | ............ | 338/42 |
| 4,368,824 A * | 1/1983 | Thomasson | ............ | 212/278 |
| 4,553,118 A * | 11/1985 | Agatahama | ............ | 335/79 |
| 5,339,699 A * | 8/1994 | Carignan | ............ | 73/862.69 |
| 5,485,748 A * | 1/1996 | Zeamer | ............ | 73/862.61 |
| 7,219,564 B1 * | 5/2007 | May | ............ | 73/862.333 |
| 2006/0053898 A1 | 3/2006 | Selig et al. | | |
| 2006/0112769 A1 | 6/2006 | Selig et al. | | |

FOREIGN PATENT DOCUMENTS

| | | |
|---|---|---|
| CH | 649 154 A5 | 4/1985 |
| DE | 693 09 913 T2 | 10/1997 |
| EP | 0 270 322 A2 | 6/1988 |
| EP | 1 335 193 A2 | 8/2003 |
| WO | WO 2004/083792 A1 | 9/2004 |
| WO | WO 2004/106876 A1 | 12/2004 |

* cited by examiner

*Primary Examiner*—Edward Lefkowitz
*Assistant Examiner*—Octavia Davis
(74) *Attorney, Agent, or Firm*—Leydig, Voit & Mayer, Ltd.

(57) ABSTRACT

The invention relates to a load gauge comprising a generator-sensor assembly. Said assembly comprises a generator unit that generates a magnetic field and a sensor unit that is sensitive to magnetic fields, said generator unit and sensor unit being displaceable by a force in relation to one another. According to the invention, the generator unit comprises at least one permanent magnet and a second permanent magnet, each with a geometric cross-section that remains essentially constant in a longitudinal direction. The first permanent magnet and the second permanent magnet are situated at an angle to one another.

23 Claims, 6 Drawing Sheets

FORCE MEASURING DEVICE

CROSS-REFERENCE TO RELATED APPLICATIONS

This application is a continuation of International Application No. PCT/EP2006/002881 filed on Mar. 30, 2006, claiming the priority of German application No. 10 2005 016 432.3 filed on Apr. 5, 2005, which are each incorporated herein by reference in their entireties.

The invention relates to a force measuring device comprising a transducer-sensor assembly with a transducer device that generates a magnetic field and a sensor device that is sensitive to magnetic fields, wherein the transducer device and the sensor device are movable relative to one another by force acting on the force measuring device.

From WO 2004/083792 there is known a force measuring cell with an elastically deformable force transducer for taking up a weight force and a sensor arrangement for detecting the deformation of the force transducer and converting it into an electrical weighing signal, wherein the force transducer is connected to a mounting part on a first end and at its second end carries a force introduction part, and wherein the force transducer is configured as a hollow bar with two weakening zones spaced in the longitudinal direction of the bar.

A force measuring cell is known from WO 2004/106876 A1 with an elastically deformable membrane force transducer for taking up pressure and tensile forces to be determined, with a sensor arrangement for detecting the deformation of the force transducer and converting it into an electrical weighing signal, and with a bend-resistant multiple-part housing with an interior for housing and mounting the membrane force transducer and the sensor arrangement, wherein the housing surrounds the force transducer substantially on all sides and has a passage, through which the membrane force transducer can be subjected to the force to be determined, wherein the membrane force transducer comprises a centrally arranged force introduction part and the edge region comprises an edge part projecting over at least one of the membrane surfaces, and wherein a resilient region, into which the projecting edge of the force transducer can positively engage, is configured in the interior of the housing.

A force measuring device is known from EP 1 335 193 A2 with an element that is flexible at least in some regions and a tongue element fastened thereto, with a magnet and a sensor that is sensitive to magnetic fields, wherein the tongue element is arranged between two regions of the flexible element, the tongue element is fixedly connected to a region of the flexible element at its one end and in the case of elastic deformations of the flexible element can be deflected at its free end relative to the other region, and this deflection can be measured by means of the magnet and the sensor that is sensitive to magnetic fields.

The object forming the basis of the invention is to provide a force measuring device of the aforementioned type, with which an improvement in characteristic values is achieved in a simple manner.

This object is achieved according to the invention with the aforementioned force measuring device in that the transducer device comprises at least a first permanent magnet and a second permanent magnet, which each have a substantially constant geometric cross-section in a longitudinal direction, and that the first permanent magnet and the second permanent magnet are arranged at an angle to one another.

The arrangement of the first permanent magnet and the second permanent magnet at an angle to one another results in a V-shaped arrangement of the first permanent magnet and the second permanent magnet on the transducer device. High magnetic field focussing can be achieved as a result of the angled arrangement. This results in an improvement in the characteristic values of the transducer-sensor assembly. The magnetic energy density is increased, so that the transducer-sensor assembly is less sensitive to magnetic stray fields. Moreover, the sensor device can be optimally aligned with respect to the magnetic axis of the transducer device.

These advantages are achieved without the first permanent magnet and the second permanent magnet having to have a special geometric form. These can be configured with a substantially constant cross-section in the longitudinal direction, i.e. no thinner or thicker regions need to be provided. In particular, conventional rectangular magnets or cylindrical bar magnets can be used. As a result of this, the solution according to the invention can be achieved in an inexpensive manner.

The transducer-sensor assembly can be used in a multiplicity of different force measuring devices or force measuring cells, irrespective of the manner in which the relative movement between the sensor device and the transducer device is assured. For example, the transducer-sensor assembly according to the invention can be used in force measuring devices with the basic structure such as described in WO 2004/106876 A1 or WO 2004/083792 A1 or EP 1 335 193 A2.

Advantageously, the first permanent magnet and the second permanent magnet are dipole magnets. Corresponding poles can then be specifically oriented with respect to the sensor device. As a result, high field focussing and high magnetic energy density can be achieved.

In particular, the north magnetic pole and south magnetic pole follow one another in the longitudinal direction of the first permanent magnet. This allows a high focussing and high magnetic field density in a front region in front of the transducer device, in which the sensor device is arranged.

For the same reason, it is favourable if the north magnetic pole and south magnetic pole follow one another in the longitudinal direction of the second permanent magnet.

The force measuring device according to the invention can be produced in an inexpensive manner if the first permanent magnet and the second permanent magnet are configured substantially identically.

In an embodiment, the first permanent magnet is formed between a first boundary plane and a parallel second boundary plane. Such a rectangular magnet can be produced in a simple manner.

For the same reason, it is favourable if the second permanent magnet is formed between a first boundary plane and a parallel second boundary plane.

It is most particularly advantageous if the first boundary plane of the first permanent magnet and the first boundary plane of the second permanent magnet lie at an acute angle to one another. As a result, a V-shaped arrangement of the first permanent magnet and the second permanent magnet is achieved with a corresponding improvement in characteristic values and focussing of the magnetic field, which leads to an increased magnetic flux density.

For example, it is possible that the first permanent magnet and the second permanent magnet are configured as cylindrical bar magnets (round bar magnets). A high energy density can be achieved if the first permanent magnet and/or the second permanent magnet is/are cuboidal. The cross-section of the permanent magnets in their longitudinal directions is then rectangular.

In particular, the longitudinal directions of the first permanent magnet and the second permanent magnet lie at an acute angle to one another. As a result, a high magnetic field density can be achieved in a front region in front of the transducer device.

The acute angle advantageously lies between 5° and 45°. In a specific embodiment, the angle lies in the order of magnitude of 15°. With a larger angle the space requirement is increased. In addition, in the case of too large an angle, the effective range of relative movement between the sensor device and the transducer device decreases. In particular in the case of too small an angle, no improvement in characteristic values occurs.

It is favourable if a respective pole of the first permanent magnet and of the second permanent magnet is directed towards the sensor device. This allows an effective field focussing to be achieved.

In particular, the north magnetic pole of one permanent magnet and the south magnetic pole of the other permanent magnet points towards the sensor device. In this way, a high magnetic field density can be achieved in a front region in front of the transducer device.

The force measuring device according to the invention can be produced in a simple manner if the first permanent magnet is arranged in a first receiver of the transducer device and the second permanent magnet is arranged in a second receiver of the transducer device. As a result, the permanent magnets can be secured in a simple manner to the transducer device. For example, they are held adhesively on corresponding receiving means.

Advantageously, the first receiver and the second receiver are arranged at an angle to one another. As a result, a field focussing in a front region in front of the transducer device can be achieved in an effective manner.

It can be provided that a wedge element is seated between the first permanent magnet and the second permanent magnet. As a result of this wedge element, the two permanent magnets can be secured to the transducer device by being clamped in position. It is then no longer necessary to provide an adhesive fixture. For example, it is possible to create a receiving means for the first and the second permanent magnet on the transducer device, wherein this receiving means is sub-divided by the wedge element into a first receiving means for the first permanent magnet and a second receiving means for the second permanent magnet. The wedge element is configured such that a force can be exerted onto the permanent magnets over a large area, and as a result of this point-like pressures on the permanent magnets are prevented. (Magnetic materials are often very brittle.) A wedge element is made from silicone, for example.

In particular, the longitudinal direction of the first permanent magnet and the longitudinal direction of the second permanent magnet intersect in a region in front of the transducer device, in which the sensor device is arranged. The permanent magnets arranged at an angle relative to one another are thus oriented to the sensor device, so that a high magnetic field density results in the region in which the sensor arrangement is positioned.

It is favourable if the sensor device comprises at least one Hall effect sensor. As a result, a change in the influencing of the field of the sensor device as a result of an exertion of force onto the force measuring device can be detected in a simple and effective manner, and an electrical weighing signal corresponding to the exerted force can be provided.

In one embodiment, an elastic force transducer is provided, to which the transducer device or the sensor device is coupled. If a force is exerted onto the force transducer that leads to its deformation, then a change in the relative position between the transducer device and the sensor device occurs. This change is recorded by the sensor device, which generates a corresponding electronic weighing signal. A corresponding force measuring device on the elastic force transducer is described, for example, in patent document WO 2004/083792 A1, to which reference is expressly made.

In this case, it can be provided that the force transducer is configured as a hollow bar, which has a first weakening zone and a spaced second weakening zone. Articulation points are provided as a result of the weakening zones (which are achieved in particular by weakening of the wall of the hollow bar) in order to give the force transducer the function of a parallelogram force transducer.

The force measuring device according to the invention can be advantageously used on a vehicle and in particular on a motor vehicle.

For example, the force measuring device according to the invention is used on a vehicle seat, for example, to determine weight data in association with an airbag control system.

The following description of preferred embodiments serves to explain the invention in more detail in association with the drawing.

Figure 1:
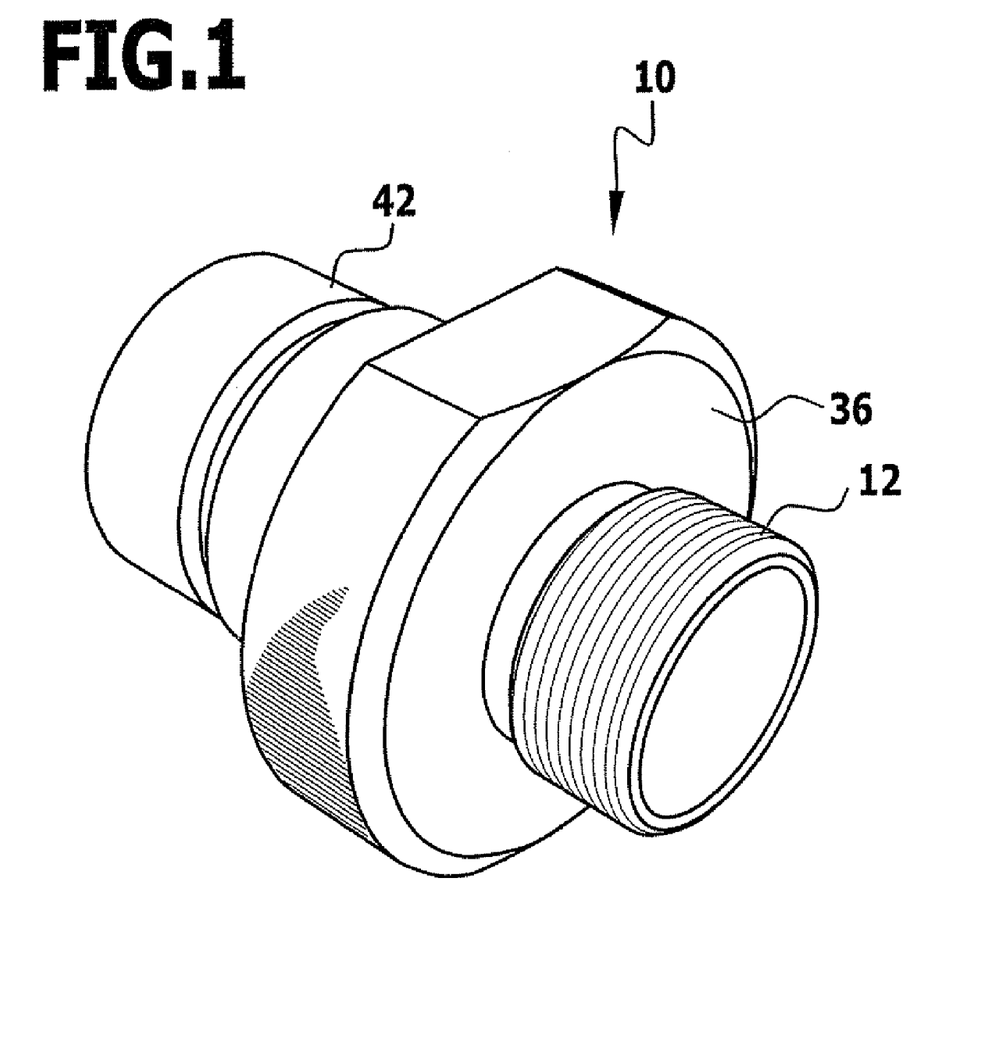
FIG. 1 is a perspective view of an exemplary embodiment of a force measuring device according to the invention in the form of a force measuring cell.
Figure 2:
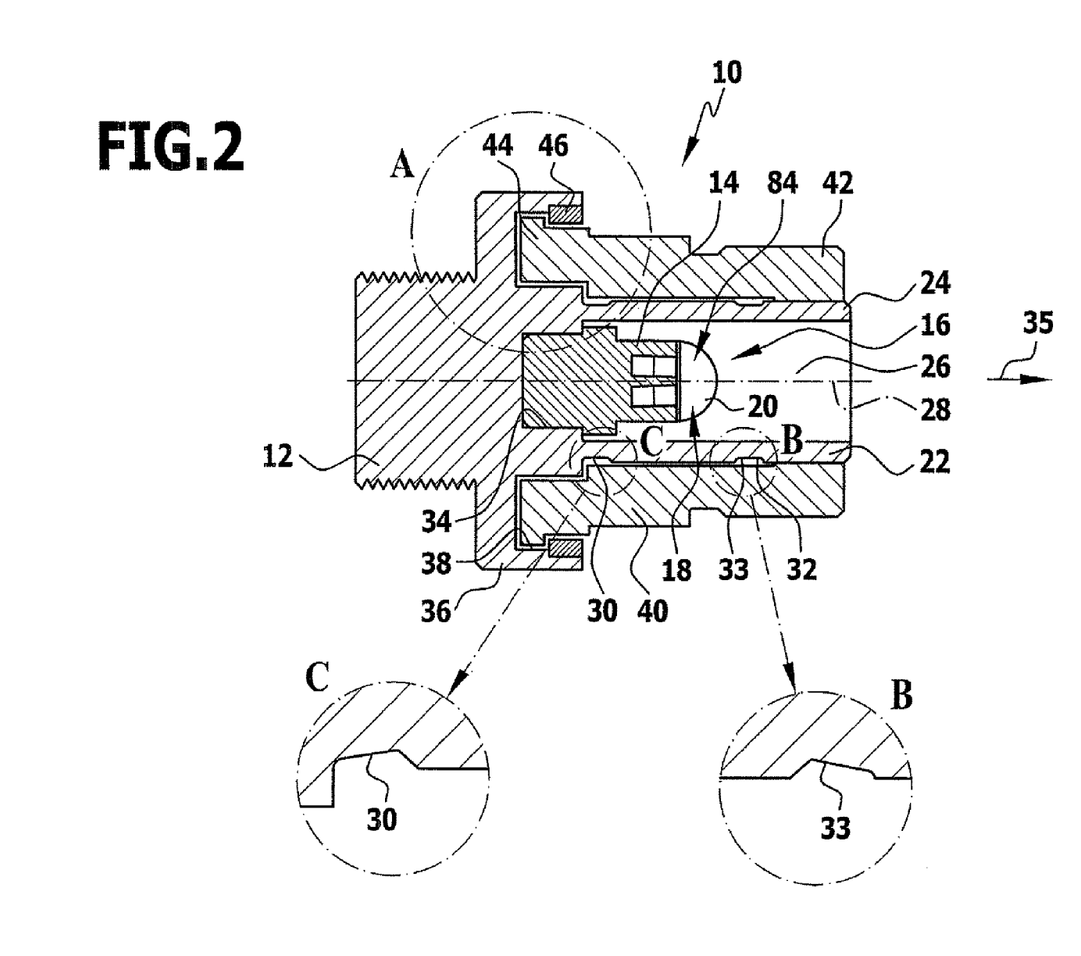
FIG. 2 is a sectional view of the sensing device according to FIG. 1.
Figure 3:
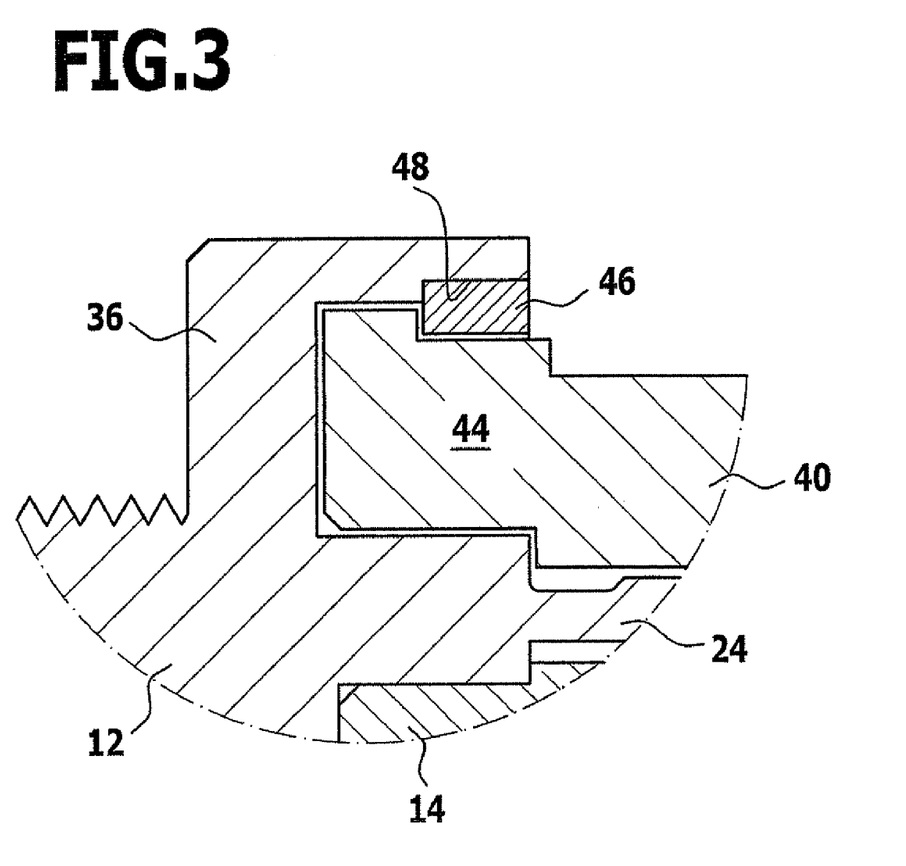
FIG. 3 is an enlarged view of region A according to FIG. 2.
Figure 4:
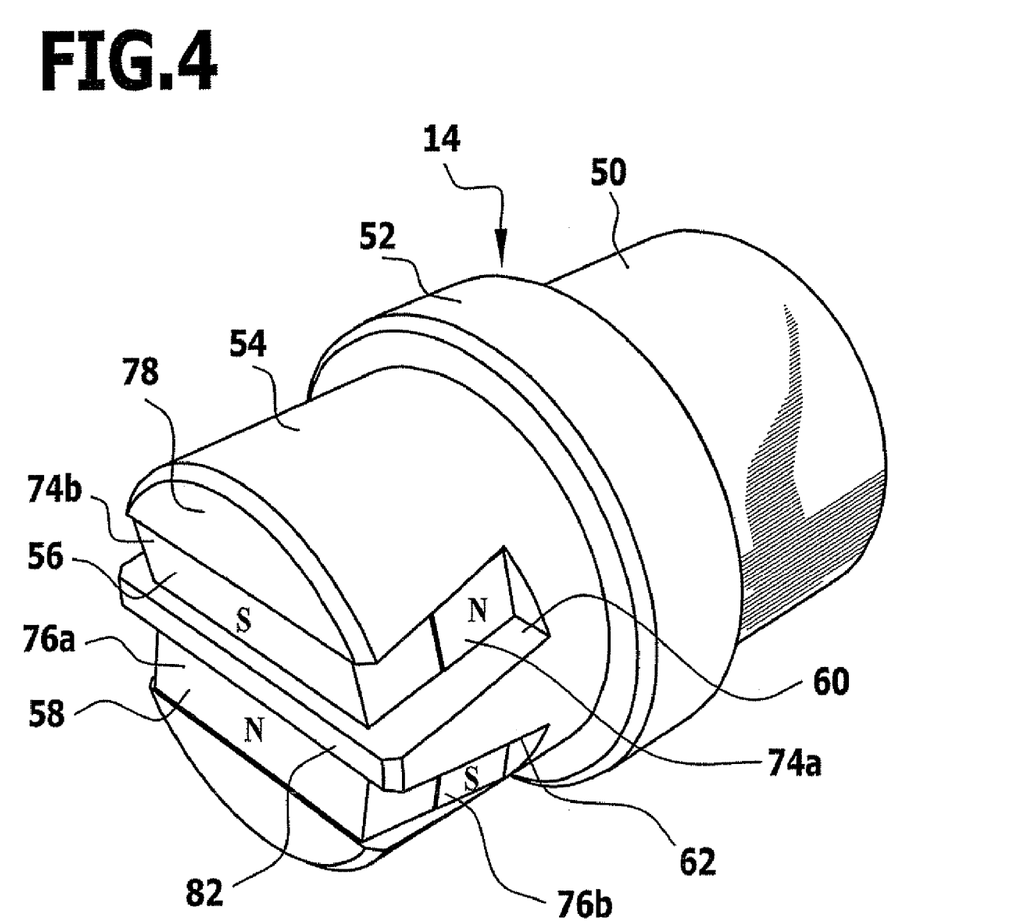
FIG. 4 is a perspective view of an exemplary embodiment of a transducer device.

An exemplary embodiment of a force measuring device according to the invention, which is shown in FIGS. 1 to 3 and is given the reference 10 there, is configured, for example, as a force measuring cell. The force measuring device 10 comprises a mounting part 12, which holds a transducer device 14 (FIGS. 4 to 6) of a transducer-sensor assembly 16.

The transducer-sensor assembly 16 comprises a sensor device 18 with at least one sensor 20 that is sensitive to magnetic fields such as a Hall effect sensor, for example (FIG. 2). The sensor device 18 is arranged in front of the transducer device 14.

The force measuring device 10 can be used, for example, on a vehicle and in particular a motor vehicle, and used on a vehicle seat, for example. The force measuring device 10 can be mounted on the upper rail of a vehicle seat mounting, for example, by means of the mounting part 12.

An elastically configured force transducer 22 present, for example, in the form of a hollow bar 24 with an interior 26 is seated on the mounting part 12. This hollow bar 24 extends in a longitudinal direction 28, wherein the interior 26 is cylindrical with an axis, which coincides with the longitudinal direction 28.

The force transducer 22 has a first weakening zone 30 and a second weakening zone 32, which are formed by recesses on an outside of the hollow bar 24. The first weakening zone 30 and the second weakening zone 32 are spaced from one another in the longitudinal direction 28.

The weakening zones 30, 32 are ring-shaped or in the shape of an envelope of cone. Articulation points that give the force transducer 22 the function of a parallelogram force transducer are formed by the weakening of the wall of the hollow bar 24.

For example, the weakening zones 30, 32 have a base 33 inclined with respect to the longitudinal direction 28. The inclination can lie at approximately 3°, wherein the depth of weakening zone 32 decreases in the direction 35 and the depth of weakening zone 30 decreases in the contrary direction to direction 35. A better symmetry for the parallelogram deflection is achieved because of the inclination of the bases 33 of the weakening zone 30, 32 to the longitudinal direction 28 and away from one another.

In the enlarged sections B (for the second weakening zone 32) and C (for the first weakening zone 30), the inclined bases are shown enlarged (with an exaggerated inclination for reasons of drawing clarity).

Preferably the sensor 20 is seated centrally between the first weakening zone 30 and the second weakening zone 32 on the axis of the interior 26.

The transducer device 14 is seated in a cylindrical recess 34 of the mounting part 12. This recess 34 is located in the interior 26 of the hollow bar 24 or is directed towards this. The transducer device 14 sits in the interior 26 without contact with the wall of the hollow bar 24.

The mounting part 12 has a ring-shaped flange 36 with a ring-shaped recess 38. A force introduction means 40, by means of which forces can be directed into the force transducer 22, is seated in the recess 38. The force introduction means 40 is seated in the recess 38 with play.

The force introduction means 40 is hollow cylindrical and lies coaxially to the force transducer 22. It has a force introduction region 42, which holds a free end region of the force transducer 22. (The force transducer 22 is held on the mounting part 12 by means of the other end region.)

In addition, the force introduction means 40 has a holding end region 44, which enters the recess 38 of the mounting part 12 and is held there.

The holding end region 44 of the force introduction means 40 is received in the recess 38 of the mounting part 12 with play. (The distances shown in FIGS. 2 and 3 are not to scale.)

So long as permissible forces act on the force introduction means 40, this can move unhindered in the recess 38 because of the play. If the acting forces become impermissibly high, then a stop ring 46, which is arranged between the holding end region 44 and a wall defining the recess 38, prevents any further movement of the force introduction means 40 and thus prevents any damage to the force transducer 22.

The stop ring 46 is secured to the mounting part 12 by laser welding, for example. In this case, it can be arranged in a corresponding recess 48 of the mounting part 12 adjoining recess 38.

The force transducer 22 is elastically deformable. As a result, it can take up forces such as weight forces, for example. Force measuring cells with an elastically deformable force transducer, wherein the force transducer is connected to a mounting part at a first end and at its second end bears a force introduction means, wherein the force transducer is configured as a hollow bar with two weakening zones spaced in the longitudinal direction of the hollow bar, are described in patent document WO 2004/083792 A1, to which reference is expressly made. The above-described basic structure of the force measuring device 10 is also disclosed in this document as well as variants and alternatives.

The transducer device 14 (FIGS. 4 to 6) comprises a cylindrical holding region 50, by means of which the transducer device 14 is seated in the recess 34. Following the holding region 50 is a ring flange 52, which has a larger diameter than the holding region 50. Following the ring flange 52, the transducer device 14 has a receiving region 54 for a first permanent magnet 56 and a second permanent magnet 58. For this, the receiving region 54 has a first receiver 60 and a second receiver 62, wherein the first permanent magnet 56 is arranged in the first receiver 60 and the second permanent magnet 58 is arranged in the second receiver 62. The permanent magnets 56 and 58 are adhesively secured, for example, in the associated receivers 60 and 62.

Figure 6:
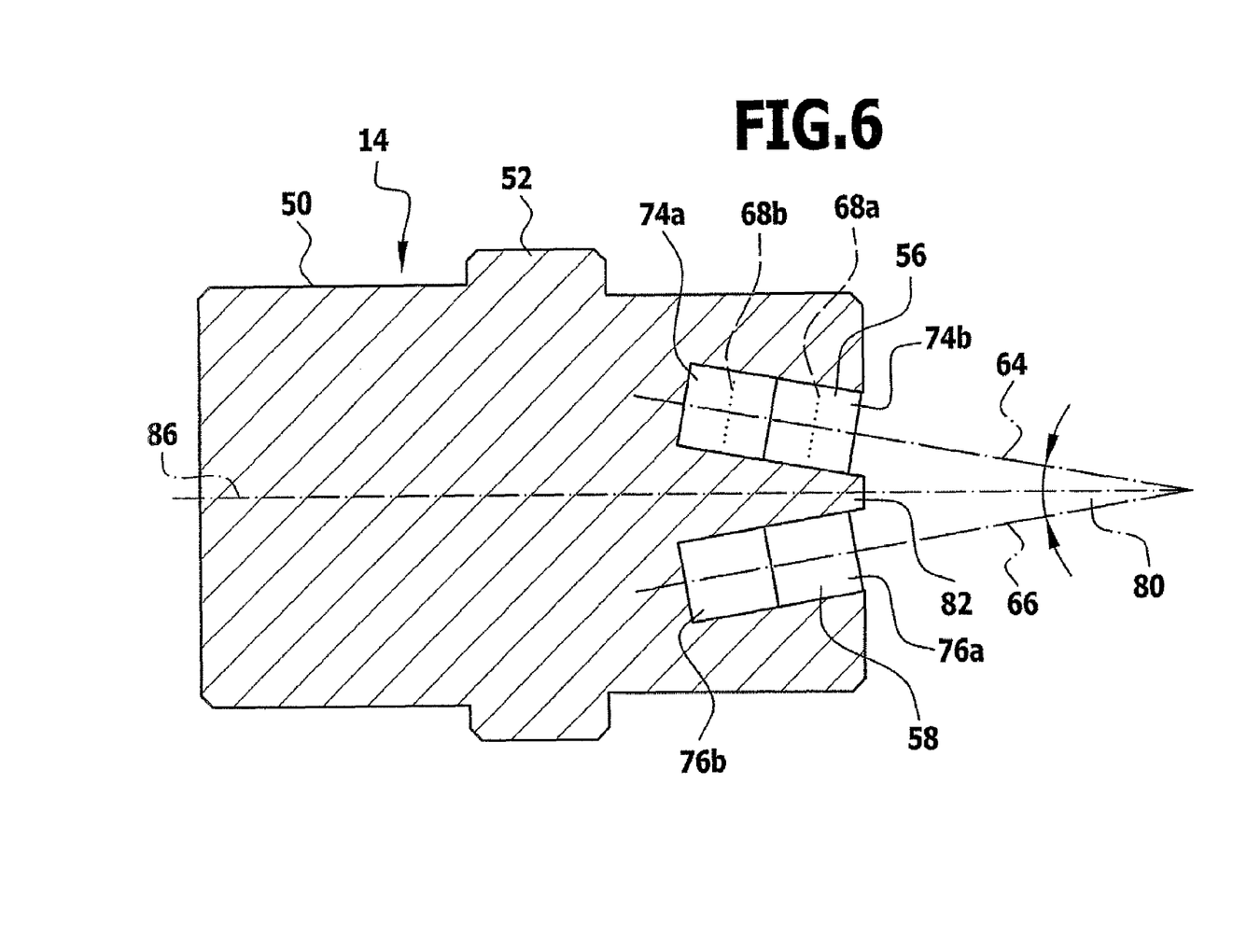
FIG. 6 is a sectional view taken along line 6-6 according to FIG. 5.

The first permanent magnet 56 extends in a first longitudinal direction 64 and the second permanent magnet 58 extends in a second longitudinal direction 66 (FIG. 6). In the respective longitudinal directions 64 and 66, the permanent magnets 56 and 58 respectively have a constant cross-section (perpendicularly to the respective longitudinal directions 64, 66). Cross-sections 68a and 68b are indicated in FIG. 6. These cross-sections 68a, 69b are substantially the same with respect to shape and area.

In principle, it is possible that the permanent magnets 56 and 58 are bar magnets with circular cross-section, for example.

In a preferred embodiment, the permanent magnets 56 and 58 are cuboidal and thus have a rectangular cross-section in their respective longitudinal directions 64 and 66, wherein this rectangular cross-section is substantially constant in the longitudinal directions 64 and 66 with respect to shape and area.

In particular, the first permanent magnet 56 and the second permanent magnet 58 are substantially identical in configuration.

Figure 5:
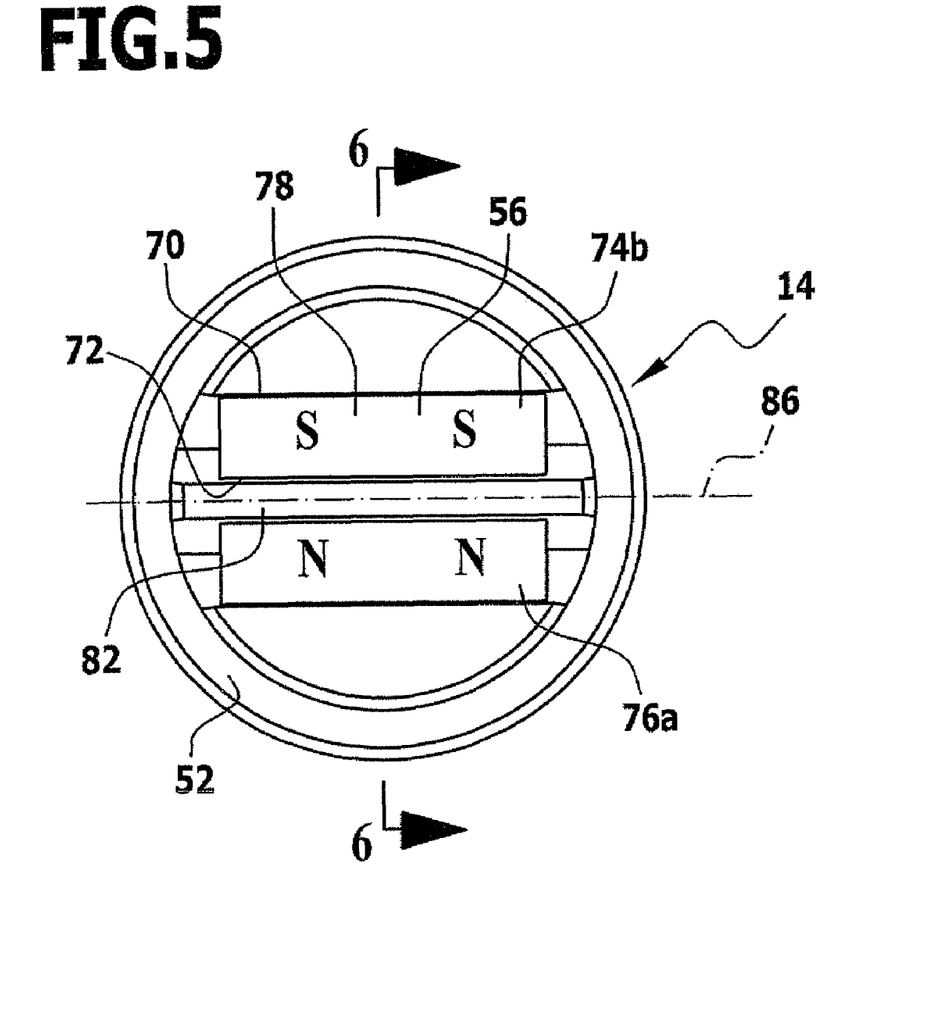
FIG. 5 is a front view of the transducer device according to FIG. 4.

The first permanent magnet 56 then extends, for example, between a first boundary plane 70 and a parallel second boundary plane 72 (FIG. 5).

In particular, the permanent magnets 56 and 58 are configured as dipole magnets with a respective north magnetic pole 74a and south magnetic pole 74b (first permanent magnet 56) and a north magnetic pole 76a and south magnetic pole 76b (second permanent magnet 58).

In the case of the first permanent magnet 56 the north magnetic pole 74a and the south magnetic pole 74b follow one another in the longitudinal direction 64. In the case of the second permanent magnet 58 the north magnetic pole 76a and the south magnetic pole 76b follow one another in the longitudinal direction 66.

In this case, it can be provided that the two permanent magnets 56 and 58 are arranged in reversed polarity, i.e. the south magnetic pole 74b of the first permanent magnet 56 lies at a front side 78 and the north magnetic pole 76a of the second permanent magnet 58 lies at this front side 78.

A front region 84 (FIG. 2), in which the sensor device 18 is arranged, lies in the interior 26 in front of the front side 78.

Particularly in the case of cuboidal permanent magnets 56, 58, the receiving means 60 and 62 can be configured as laterally open slots.

The first longitudinal direction 64 and the second longitudinal direction 66 of the permanent magnets 56, 58 lie at an acute angle 80 (less than 90°) to one another. This angle lies in the order of magnitude of between 5° and 45°, for example. In a specific embodiment, the angle 80 lies at approximately 15°. As a result, the two permanent magnets 56, 58 are arranged in a V shape relative to one another.

Boundary walls of the first receiver 60 and the second receiver 62 then also lie at an acute angle corresponding to angle 80 to one another.

In addition, boundary planes 70, 72 of the first permanent magnet 56 and the second permanent magnet 58 lie at an acute angle 80 to one another.

The first permanent magnet 56 and the second permanent magnet 58 respectively lie at a half-acute-angle to a plane 86 (FIG. 6) of the transducer device 14, wherein this acute angle is half the acute angle 80. The plane 86 is in particular a (geometric) mirror symmetric plane of the transducer device 14.

A sensor 20 and in particular a Hall effect element of the sensor device 18 is arranged so that if the force measuring device 10 does not experience any force, it is arranged on the plane 86 symmetrical to this.

An intermediate region 82 is formed between the first receiver 60 and the second receiver 62. As a result, the permanent magnets 56 and 58 do not touch one another.

The intermediate region 82 can be configured as a separate wedge element, which is made from silicone, for example. By means of such a wedge element the two permanent magnets 56 and 58 can be held clamped in the first receiver 60 and the second receiver 62 and thus secured in place. In particular, the wedge element sub-divides a recess, which is formed in the transducer device 14, into the first receiver 60 for the first permanent magnet 56 and the second receiver 62 for the second permanent magnet 58.

The sensor device 18 is coupled to the force transducer 22, i.e. in such a way that if a force is applied to the force transducer 22 by means of the force introduction means 40, the sensor device 18 is moved relative to the transducer device 14. As a result, the (at least one) sensor 20 of the sensor device 18 undergoes a change in magnetic field. This is expressed in a sensor signal, which is dependent on the change of position of the sensor device 18 relative to the transducer device 14 (i.e. to the permanent magnets 56 and 58), and is thus dependent on the applied force. As a result of the change of position of the sensor device 18 relative to the transducer device 14, an electrical signal can be generated, wherein the signal intensity is dependent on the force exerted on the force measuring device 10.

The (at least one) sensor 20 in the front region 84 is oriented to the permanent magnets 56, 58 of the transducer device 14. For example, the sensor device 18 with the (at least one) sensor 20 is arranged such that it is coaxial to the longitudinal direction 28 if no force is applied by means of the force introduction means 40.

For holding the sensor device 18 in the interior 26, a hollow cylindrical holding element is provided, for example, which is secured to an end of the hollow bar 24 and which holds the sensor device 18 at an end projecting into the interior 26 of the hollow bar 24. Such a holding element is described in patent document WO 2004/083792 A1. Reference is expressly made to this document.

The measurement principle of the force measuring device 10 is based on a force-dependent position displacement between the sensor device 18 and the transducer device 14. The change of position occurs because of an application of force into the force transducer 22.

As a result of the angled arrangement of the first permanent magnet 56 and the second permanent magnet relative to one another, an improvement in characteristic values of the transducer-sensor assembly 16 can be achieved, since the magnetic field of the two permanent magnets 56 and 58 is focussed in the front region 84. Because of the focussing, the orientation of the (at least one) sensor 20 of the sensor device 18 relative to the transducer device and in particular to the magnetic axis of the transducer device 14 can also be optimised. Since a higher energy density is achieved in the front region 84, the force measuring device 10 is less sensitive in particular to external magnetic stray fields.

Focussing of the magnetic field in the front region 84 is achieved by the V-shaped arrangement of the first permanent magnet 56 and the second permanent magnet 58. These can be produced in a simple manner. For example, conventional rectangular permanent magnets can be used. The focussing is achieved by the arrangement of the permanent magnets 56 and 58, and therefore no special configuration of the permanent magnets 56 and 58 is necessary for focussing.

The transducer-sensor assembly 16 with the transducer device 14, in which the permanent magnets 56 and 58 are arranged at an acute angle to one another and are thus arranged in a V shape, can be used in all kinds of force transducer devices, in which an electronic force signal or weighing signal is effected because of the change of position between the sensor device and the transducer device. For example, the transducer-sensor assembly according to the invention can be used in a force measuring cell such as that described in patent document WO 2004/106876 A1, or in a force measuring device such as that described in patent EP 1 335 193 A2.

The invention claimed is:

1. A force measuring device, comprising a transducer-sensor assembly with a transducer device that generates a magnetic field and a sensor device that is sensitive to magnetic fields, wherein the transducer device and the sensor device are movable relative to one another by force acting on the force measuring device, wherein the transducer device comprises at least a first permanent magnet and a second permanent magnet, which each have a substantially constant geometric cross-section in a longitudinal direction, wherein the longitudinal directions of the first permanent magnet and the second permanent magnet lie at an acute angle to one another.

2. The force measuring device according to claim 1, wherein the first permanent magnet and the second permanent magnet are dipole magnets.

3. The force measuring device according to claim 1, wherein the first permanent magnet includes a north magnetic pole and a south magnetic pole, and the north magnetic pole and south magnetic pole follow one another in the longitudinal direction of the first permanent magnet.

4. The force measuring device according to claim 1, wherein the second permanent magnet includes a north magnetic pole and a south magnetic pole, and the north magnetic pole and south magnetic pole follow one another in the longitudinal direction of the second permanent magnet.

5. The force measuring device according to claim 1, wherein the first permanent magnet and the second permanent magnet are configured substantially identically.

6. The force measuring device according to claim 1, wherein the first permanent magnet is formed between a first boundary plane and a parallel second boundary plane.

7. The force measuring device according to claim 1, wherein the second permanent magnet is formed between a first boundary plane and a parallel second boundary plane.

8. The force measuring device according to claim 7, wherein the first boundary plane of the first permanent magnet and the first boundary plane of the second permanent magnet lie at an acute angle to one another.

9. The force measuring device according to claim 1, wherein the first permanent magnet is cuboidal.

10. The force measuring device according to claim 1, wherein the second permanent magnet is cuboidal.

11. The force measuring device according to claim 1, wherein the first permanent magnet is a cylindrical bar magnet.

12. The force measuring device according to claim 1, wherein the second permanent magnet is a cylindrical bar magnet.

13. The force measuring device according to claim 1, wherein the acute angle lies between 5° and 45°.

14. The force measuring device claim 1, wherein a respective pole of the first permanent magnet and of the second permanent magnet are directed towards the sensor device.

15. The force measuring device according to claim 14, wherein a north magnetic pole of one permanent magnet and a south magnetic pole of the other permanent magnet are directed towards the sensor device.

16. The force measuring device according to claim 1, wherein the first permanent magnet is arranged in a first receiver of the transducer device and the second permanent magnet is arranged in a second receiver of the transducer device.

17. The force measuring device according to claim 16, wherein the first receiver and the second receiver are arranged at an angle to one another.

18. The force measuring device according to claim 1, wherein a wedge element is seated between the first permanent magnet and the second permanent magnet.

19. The force measuring device according to claim 1, wherein the longitudinal direction of the first permanent magnet and the longitudinal direction of the second permanent magnet intersect in a region in front of the transducer device, in which the sensor device is arranged.

20. The force measuring device according to claim 1, wherein the sensor device comprises at least one Hall effect sensor.

21. The force measuring device according to claim 1, wherein an elastic force transducer is provided, to which the transducer device or the sensor device is coupled.

22. The force measuring device according to claim 21, wherein the force transducer is configured as a hollow bar, which has a first weakening zone and a spaced second weakening zone.

23. A force measuring device, comprising a transducer-sensor assembly with a transducer device that generates a magnetic field and a sensor device that is sensitive to magnetic fields, wherein the transducer device and the sensor device are movable relative to one another by force acting on the force measuring device, wherein the transducer device comprises at least a first permanent magnet and a second permanent magnet, which each have a substantially constant geometric cross-section in a longitudinal direction, the first permanent magnet and the second permanent magnet being arranged at an angle to one another, wherein the second permanent magnet is formed between a first boundary plane and a parallel second boundary plane, and a first boundary plane of the first permanent magnet and the first boundary plane of the second permanent magnet lie at an acute angle to one another.

* * * * *